(12) United States Patent
Chase et al.

(10) Patent No.: US 10,954,686 B2
(45) Date of Patent: Mar. 23, 2021

(54) SYSTEM AND METHOD FOR INSTALLING A TENSIONING TENDON IN A WIND TURBINE TOWER

(71) Applicants: Siemens Gamesa Renewable Energy, Inc., Orlando, FL (US); Wind Tower Technologies, LLC, Boulder, CO (US)

(72) Inventors: Matthew J. Chase, Windsor, CO (US); James D. Lockwood, Boulder, CO (US); Guy Russell, Gibraleion (ES)

(73) Assignees: Siemens Gamesa Renewable Energy, Inc., Orlando, FL (US); Wind Tower Technologies, LLC, Boulder, CO (US)

(*) Notice: Subject to any disclaimer, the term of this patent is extended or adjusted under 35 U.S.C. 154(b) by 395 days.

(21) Appl. No.: 15/753,214

(22) PCT Filed: Aug. 9, 2016

(86) PCT No.: PCT/US2016/046104
§ 371 (c)(1),
(2) Date: Feb. 16, 2018

(87) PCT Pub. No.: WO2017/039975
PCT Pub. Date: Mar. 9, 2017

(65) Prior Publication Data
US 2018/0238071 A1    Aug. 23, 2018

Related U.S. Application Data

(60) Provisional application No. 62/212,001, filed on Aug. 31, 2015, provisional application No. 62/212,017, (Continued)

(51) Int. Cl.
*E04H 12/16* (2006.01)
*E04H 12/34* (2006.01)
(Continued)

(52) U.S. Cl.
CPC .............. *E04H 12/16* (2013.01); *E04H 12/34* (2013.01); *F03D 13/10* (2016.05); *F03D 13/20* (2016.05); *Y02E 10/728* (2013.01)

(58) Field of Classification Search
CPC ......... E04H 12/16; E04H 12/34; F03D 13/20; Y02E 10/728
See application file for complete search history.

(56) References Cited

U.S. PATENT DOCUMENTS 9,175,670 B2    11/2015 Lockwood et al.
2003/0000165 A1    1/2003 Tadros et al.
(Continued)

FOREIGN PATENT DOCUMENTS

CL    2015000263 A1    7/2015
CL    2015000813 A1    10/2015
(Continued)

OTHER PUBLICATIONS

PCT International Search Report and Written Opinion of International Searching Authority dated Oct. 28, 2016 corresponding to PCT International Application No. PCT/US2016/046104 filed Aug. 9, 2016.

*Primary Examiner* — Moshe Wilensky
(74) *Attorney, Agent, or Firm* — Wolter Van Dyke Davis, pllc

(57) ABSTRACT

A system and method for installing a post-tensioning tendon (130) in an equipment tower (100). A sheave frame (196) attaches to anchor rods (140), and a pulley (198) is mounted to the sheave frame through which a hoisting cable (197) is passed for connection to an end (138) of the tendon to lift the tendon to the anchor rods. A carriage assembly (150) having a shank (152) and a bearing plate platform (154) extending transversely from the shank for receiving a bearing plate (170) is attached to the tendon. The carriage assembly includes a deflecting surface (158) to deflect the carriage (Continued)

assembly away from the installed bearing plate upon lowering after tendon attachment. A pair of hydraulic jacks (210) tension the tendon to a desired load.

18 Claims, 9 Drawing Sheets

Related U.S. Application Data filed on Aug. 31, 2015, provisional application No. 62/212,035, filed on Aug. 31, 2015.

(51) Int. Cl.
    *F03D 13/20*     (2016.01)
    *F03D 13/10*     (2016.01)

(56) References Cited

U.S. PATENT DOCUMENTS

| | | |
|---|---|---|
| 2011/0138704 A1 | 6/2011 | Bagepalli et al. |
| 2014/0033628 A1 | 2/2014 | Lockwood et al. |
| 2014/0044554 A1 | 2/2014 | Lafferty |
| 2015/0247335 A1 | 9/2015 | Huber et al. |
| 2016/0069099 A1 | 3/2016 | Ohlen et al. |

FOREIGN PATENT DOCUMENTS

| | | |
|---|---|---|
| CN | 102312799 A | 1/2012 |
| CN | 103476696 A | 12/2013 |
| CN | 204163937 U | 2/2015 |
| DE | 29809541 U1 | 10/1999 |
| DE | 19823650 A1 | 12/1999 |
| DE | 102012008120 A1 | 10/2013 |
| GB | 1466998 A | 3/1977 |
| GB | 2071599 A | 9/1981 |
| KR | 101020765 B1 | 3/2011 |
| WO | 2005064101 A1 | 7/2005 |
| WO | 2011091799 A1 | 8/2011 |
| WO | 2012075607 A1 | 6/2012 |

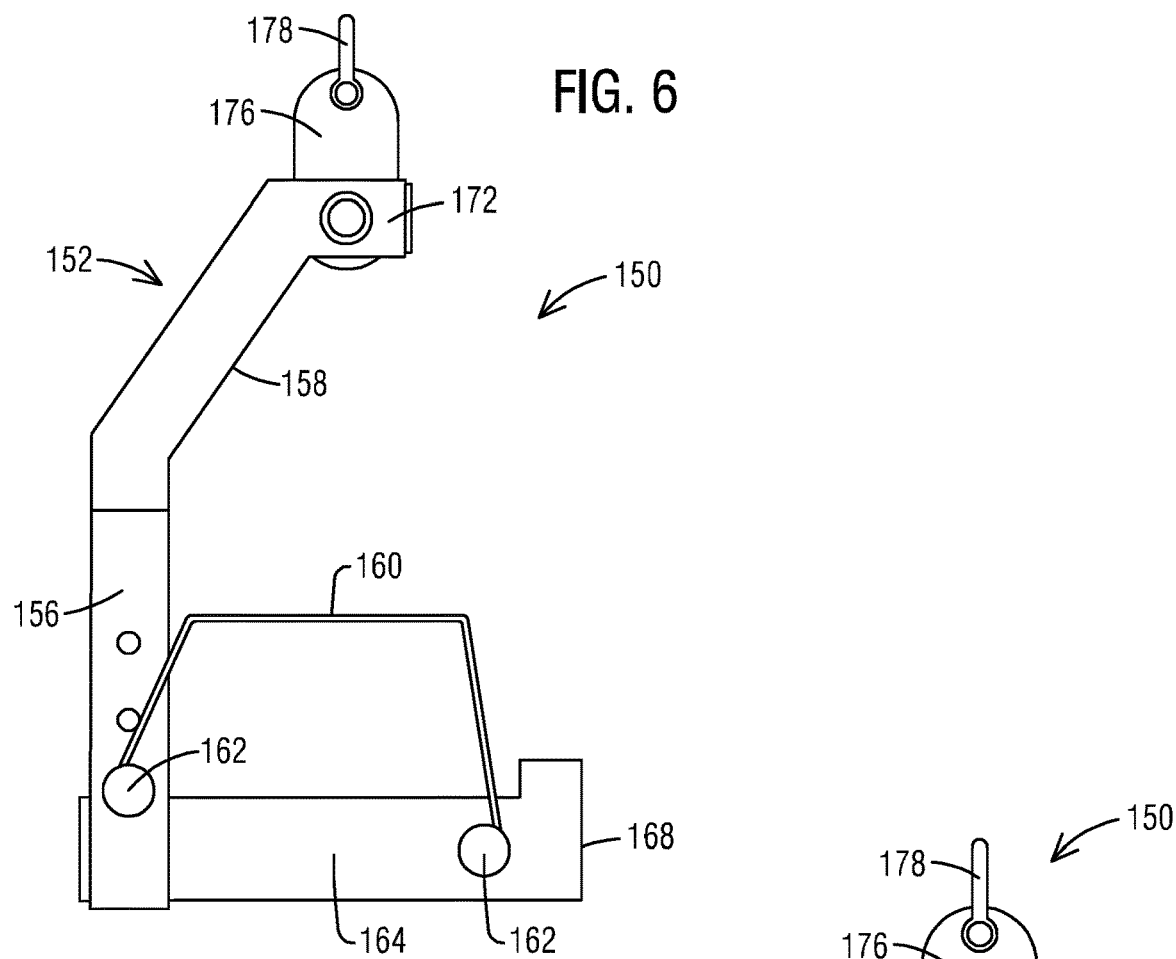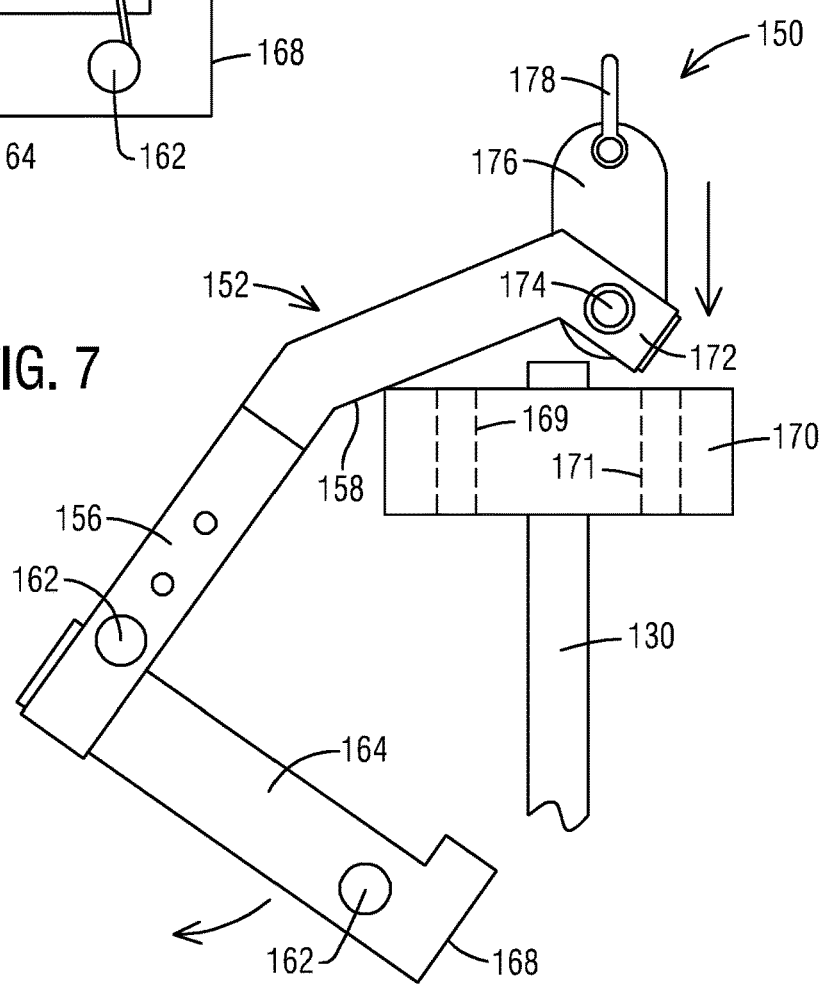

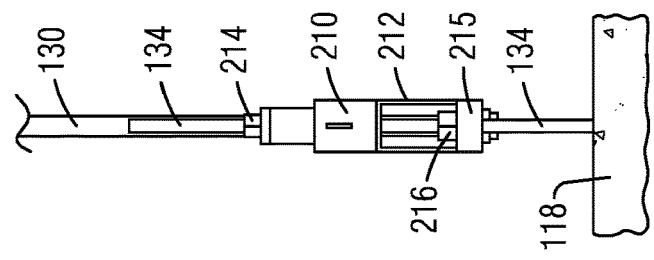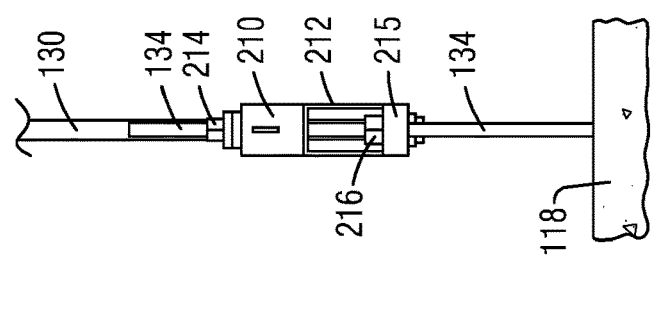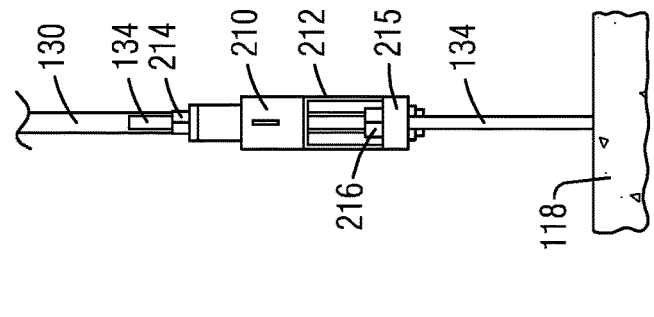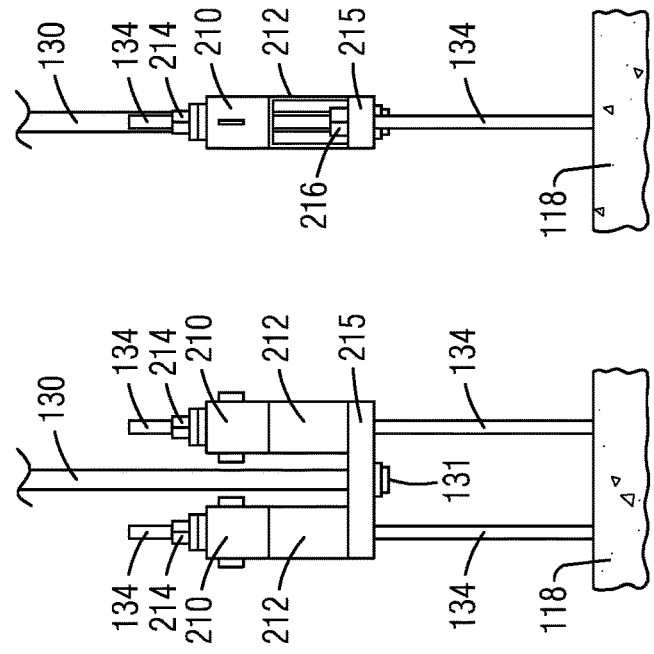

SYSTEM AND METHOD FOR INSTALLING A TENSIONING TENDON IN A WIND TURBINE TOWER

This application claims benefit of the 31 Aug. 2015 filing date of U.S. provisional application No. 62/212,001, and U.S. provisional application No. 62/212,017, and U.S. provisional application No. 62/212,035, each of which is incorporated herein by reference in its entirety.

FIELD OF THE INVENTION

This is invention relates generally to the construction of equipment towers, and more particularly, to systems and methods for installing post-tensioning tendons during the construction of a concrete wind turbine tower.

BACKGROUND OF THE INVENTION

Existing methods of constructing towers used to support different types of equipment, such as wind turbine equipment, vary depending on whether the materials are steel or concrete. The decision process used to select whether the tower is to be built out of steel or concrete depends on the geographic location, regional resources, and access to the site for constructing the tower. Steel wind towers are commonly built by bolting steel tubular sections together at intermediate flanges. The heights of steel towers are often limited by the diameter of the steel tubular sections that can be physically transported from the location where the steel pieces are fabricated to the construction site without significant modifications to existing roads, bridges, or other physical constraints. These limitations typically result in steel pieces having diameters of up to approximately 20.0 feet. As a result of these diameter limitations, the overall tower height is generally limited when using conventional strength steel. Energy production from a wind tower can generally be increased by increasing the height of the tower. Thus, the transportation constraints limit the productivity of the wind turbine when the tower is made of conventional strength steel.

Advantages of concrete towers include that the concrete sections can be constructed using local materials versus steel that is typically fabricated remotely from a tower site. As a result, the concrete sections are not transported over long distances and the transportation constraints involved with transporting steel sections are avoided. Cast-in-place construction methods allow for pouring concrete into forms at any desired height. Drawbacks to cast-in-place methods include reduced construction speed and sensitivity to inclement weather. Also, the shape of a typical concrete wind tower is tapered, which creates complexity in the concrete segment forming system.

Post-tensioning tendons may be used to reinforce towers, such as those formed with precast segments, at locations along the height of the tower to resist tower tension under externally applied loads. Tendon locations may be selected to provide the post-tensioning compressive forces where tension loads are highest. For example, because bending moments and resulting tensile forces are generally higher toward the base of the tower under externally applied loads, post-tensioning tendons may be placed at a plurality of heights on the tower to counter these applied loads. Some of the post-tensioning tendons may extend from a floor or base of the tower to its uppermost segment. Crane availability is often on the construction schedule critical path when lifting one end of the post-tensioning tendons to the tower segment for attachment to previously installed anchor rods.

BRIEF DESCRIPTION OF THE DRAWINGS

The invention is explained in the following description in view of the drawings that show:

FIG. 6 illustrates a side view of the exemplary carriage assembly of FIG. 5;

FIG. 7 illustrates a side view of the exemplary carriage assembly of FIG. 5 being released from a bearing plate in accordance with aspects of the present invention;

FIGS. 11-15 illustrate a sequence of manipulations of a pair of hydraulic jacks positioned on a pair of anchor rods for stressing a tensioning tendon in accordance with aspects of the present invention.

DETAILED DESCRIPTION OF THE INVENTION

The present inventors have recognized that the use of a construction crane to lift tensioning tendons during construction of a pre-stressed concrete equipment tower can lead to scheduling issues and increased construction costs. Accordingly, the present inventors have developed a system and method that removes this use of the overhead construction crane from the construction critical path, thereby increasing installation efficiencies.

Figure 1:
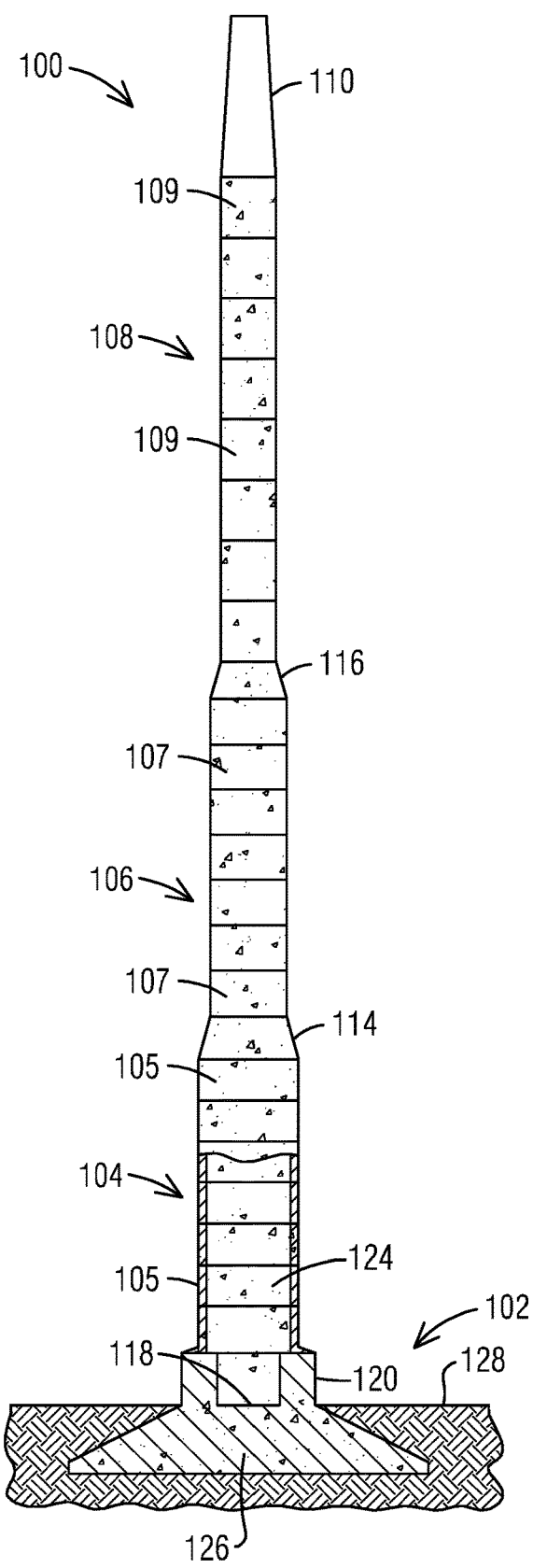
FIG. 1 illustrates an exemplary equipment tower showing a cut-away lower section of the tower.

FIG. 1 illustrates an exemplary equipment tower 100 in accordance with an embodiment of the present invention. The tower 100 is a wind turbine tower, which supports various types of equipment. Such equipment may be affixed at or proximate the top of the tower 100 or other desired locations along the length of the tower 100 depending on a particular application. Tower 100 may include a foundation 102, a bottom tower portion 104, a middle tower portion 106, a top tower portion 108 and a steel tip adapter 110. Each tower portion 104, 106, 108 may be formed with a plurality of tower segments 105, 107, 109, respectively, that may be formed of precast concrete. In an exemplary embodiment of the invention, each tower segment 105 may have a first constant diameter and a first height, each tower segment 107 may have a second constant diameter and a second height, and each tower segment 109 may have a third constant diameter and a third height. As illustrated in FIG. 1, the first constant diameter of tower segments 105 may be greater than the second constant diameter of tower segments 107, which in turn may be greater than the third constant diameter of tower segments 109, thereby forming an equipment tower 100 that decreases in diameter from the bottom tower portion 104 to the top tower portion 108. Transition segments 114 and 116 may be positioned between appropriate tower portions 104, 106, 108 to accommodate the progressive step down in the diameter of tower segments 105, 107, 109 from bottom to top of tower 100.

With continuing reference to FIG. 1, steel tip adapter 110 may connect to the topmost concrete annular tower segment of the tower 100. The steel tip adapter 110 may also connect with commercially available equipment having various functions, such as those typically used in a wind turbine. Such equipment could include rotor blades, a rotor, a drivetrain, a gearbox, a generator, an electrical system, a nacelle, controls, and other types of equipment use to convert the wind's kinetic energy into electrical energy.

Tower segments 105, 107, 109 may be precast concrete each having constant diameters and heights. Tower segments 105, 107, 109 may also be match cast together to achieve a precision fit between adjacent sections. Such match cast joints may incorporate a shear key configuration used to transfer shear across the segment joints under transverse loads to the equipment tower 100 and to assist with aligning segments with each other during construction. An exemplary match cast configuration is disclosed in U.S. Pat. No. 9,175,670 issued to Lockwood et al., which is incorporated herein by reference in its entirety. In some instances, epoxy may be applied onto a segment joint prior to closing the gap between two segments. The epoxy may lubricate the annular face of the segments when placing sections on top of one another then seal the joint after the epoxy cures. Further, grout may be used to secure tower segments 105, 107, 109 together depending on site specific parameters.

FIG. 1 further illustrates foundation 102 that may include a platform 118 and a tapered subsection 126. A pedestal or plinth 120 may extend out of platform 118 and have an inside surface that defines an internal chamber 124. The tapered subsection 126 may extend from platform 118 so it is located below ground level 128. In the construction of tower 100, a base of the tapered subsection 126 may be round, square, polygonal or other appropriate shapes depending on site specific parameters. The top portion of subsection 126 may be rounded or formed with a plurality of contiguous flat surfaces as the site specific parameters require. Foundation 102 may be cast-in-place then, after the concrete is cured, subsection 118 may be back filled with dirt to cover its top surface.

Figure 2:
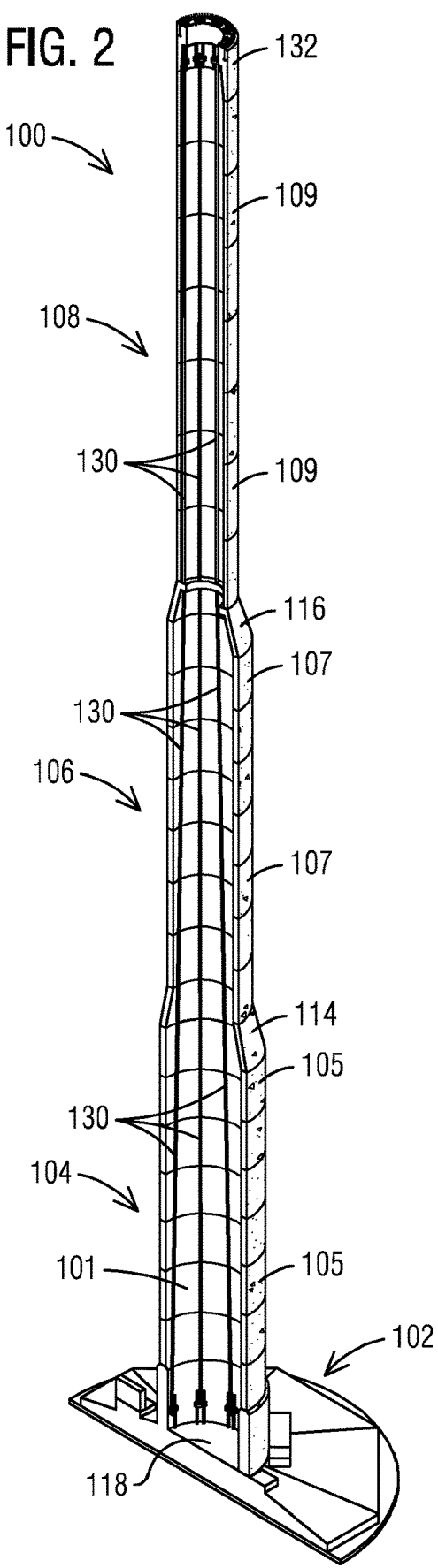
FIG. 2 illustrates a cross sectional view of the tower of FIG. 1.
Figure 3:
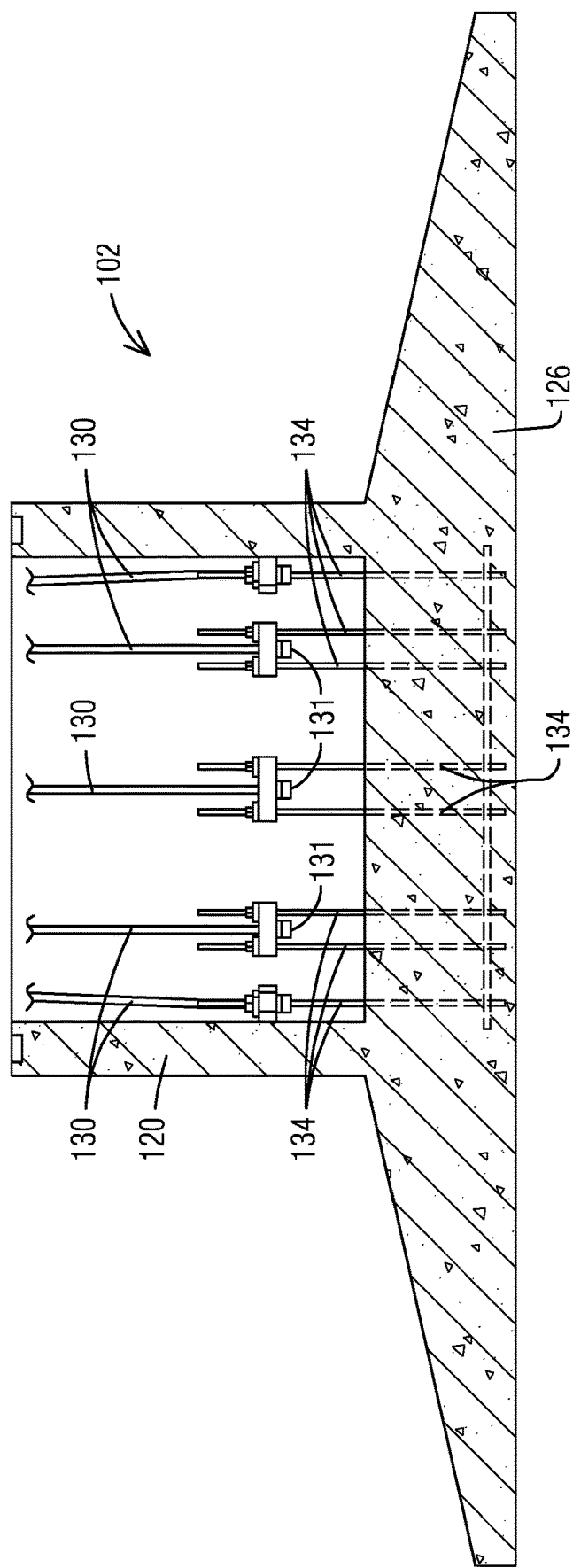
FIG. 3 illustrates a cross sectional view of an exemplary connection of post-tensioning tendons with a base of the tower of FIG. 1.
Figure 4:
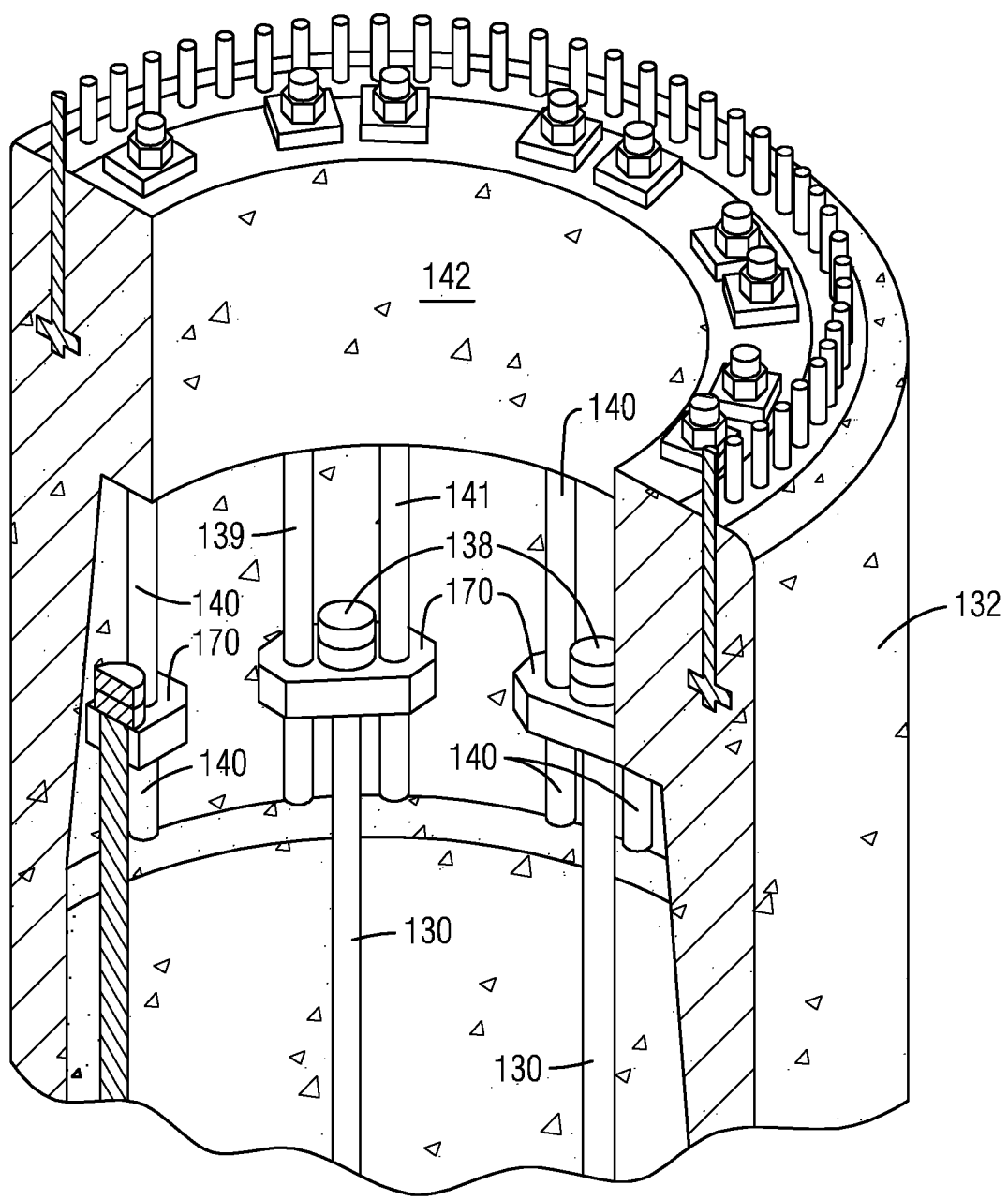
FIG. 4 illustrates a cross sectional view of an exemplary connection of post-tensioning tendons with an upper segment of the tower of FIG. 1.

FIG. 2 illustrates a cross section of the exemplary tower 100 of FIG. 1 having multiple post-tensioning tendons 130 extending from foundation 102 to a top most tower segment 132. As best illustrated in FIGS. 3 and 4, a first end 131 of each tendon 130 may be connected by conventional techniques with foundation 102 by attachment with a respective pair of lower anchor rods 134 anchored in foundation 102 via an embedded ring 136. A second end 138 of each tendon 130 may be connected by conventional techniques with topmost tower segment 132 by attachment with a respective pair 139, 141 of upper anchor rods 140 that may be embedded within a diaphragm portion 142 of top most tower segment 132.

In an exemplary embodiment of the present invention, post-tensioning tendons 130 may be aligned with the length of tower 100 and reside within the central opening 101 of tower 100. Post-tensioning tendons 130 put the annular tower segments 105, 107, 109 and transition segments 114, 116 into compression. While an exemplary embodiment of the present invention allows for the second end 138 of each respective tendon 130 to be connected with top most tower segment 132, alternate embodiments allow for the second end 138 of one or more respective tendons 130 to be connected with any appropriate tower segment 105, 107, 109 and/or transition segments 114, 116 as a function of the tower design parameters. Similarly, first end 131 of one or more tendons 130 may be anchored to tower segments other than to tower platform 118. Those skilled in the art will recognize that first and second ends 131, 138 of tendons 130 may be connected to various tower segments in various combinations as a function of site specific and/or tower specific parameters.

An advantage of exemplary embodiments of the present invention is that post-tensioning tendons 130 may be installed during construction of tower 100 without dependence on the use of a conventional crane. Taking a crane off the critical construction path allows for flexibility in scheduling the installation of tendons 130, which can increase construction efficiencies and reduce construction costs. During construction, a second end 138 of a post-tensioning tendon 130 may be brought into central opening 101 of tower 100 through a door 103 (FIG. 12) or another type of opening located near the bottom of tower 100. Referring primarily to FIG. 12, second end 138 of tendon 130 may be connected with a hoisting cable 197 while a portion of the tendon 130 remains outside tower 100. A stand-alone winch 199 operably connected with the hoisting cable 197 and secured in place at the bottom of tower 100 may be activated causing the hoisting cable 197 to wind around a spool of the winch assembly. With the winch 199 activated, the hoisting cable 197 lifts second end 138 of tendon 130 to an attachment point, such as to upper anchor rods 140 of upper segment 132, and may simultaneously pull the remaining portion of tendon 130 into central opening 101. With second end 138 attached to anchor rods 140, first end 131 of tendon 130 may be attached to lower anchor rods 130. Post-tensioning tendon 130 may then be stressed to desired loads and the process repeated.

Figure 5:
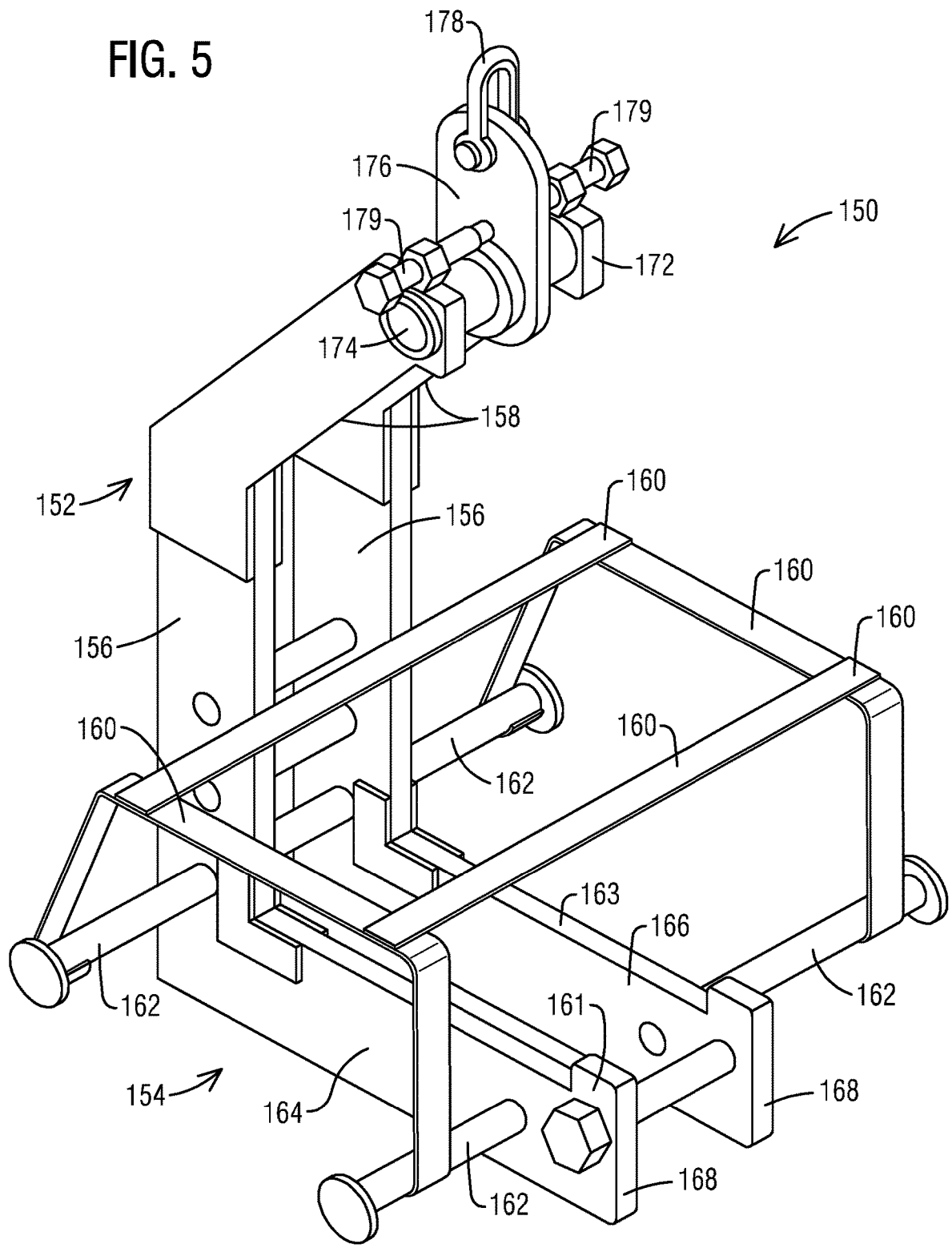
FIG. 5 illustrates a perspective view of an exemplary hook or carriage assembly in accordance with aspects of the present invention.

FIG. 5 illustrates a perspective view of an exemplary hook or carriage assembly 150 in accordance with aspects of the invention. Carriage assembly 150 may include a shank 152 and a bearing plate platform 154 transversely oriented with respect to a vertical portions 156 of shank 152. Shank 152 may be configured with deflecting surfaces 158 connected with vertical portions 156. In an exemplary embodiment of the present invention, deflecting surfaces 158 may form an obtuse angle with vertical portions 156 to encourage carriage assembly 150 to deflect away from a second end 138 of a post-tensioning tendon 130 when post-tensioning tendon 130 is connected with anchor rods 140 as more fully described hereinafter. In an exemplary embodiment, the obtuse angle may be between about 130 degrees to 150 degrees, or between about 135 degrees to 145 degrees.

As shown in FIG. 5, deflecting surface 158 is a linear surface formed on a portion of shank 152. Alternate embodiments of the invention allow for deflecting surface 158 to be nonlinear such as a surface having a constant or variable radius of curvature depending on the size and shape of a bearing plate 170 (FIG. 4) and the configuration of the anchor rods to which it will be attached. For example, deflecting surface 158 may be formed as a camming surface configured to ensure bearing plate 170 is released from carriage assembly 150 after bearing plate 170 is fixed in place and the assembly 150 is being lowered.

Carriage assembly 150 is illustrated having a plurality of straps 160 that may be configured to be releasably connected with pins or dowels 162 extending from plate platform 154. Plate platform 154 may be formed by a first arm 164 and a second arm 166 each extending substantially perpendicularly from respective vertical portions 156 that form a relatively flat surface to provide a level area for supporting bearing plate 170. Plate platform 154 may take on alternate configurations provided that bearing plate 170 can be supported in a relatively flat or horizontal position while being lifted. Straps 160 may be configured and sized to ensure that a bearing plate 170 may be releasably held against bearing plate platform 154 when bearing plate 170 is being lifted toward the top most tower segment 132 for attachment to upper anchor rods 140. Straps 160 may be made from various materials and may be releasably attachable to dowels 162 so that bearing plate 170 may be placed on plate platform 154 and secured thereon for lifting to the top most tower segment 132. Other attachment mechanisms may be used instead of straps 160 such as magnets, snaps, clamps, compressive fit mechanisms, levers, pins, other types of attachment mechanisms, of combinations thereof. In other embodiments, a first attachment mechanism may be associated with the first arm 164 and a second attachment mechanism with second arm 166.

FIG. 6 illustrates a side view of carriage assembly 150 where straps 160 may extend all the way to an end portion 168 of first and second arms 164, 166, at which point respective straps 160 may be releasably attachable to dowels 162. FIG. 6 further illustrates that carriage assembly 150 may include a top portion 172 extending from a shank 152 through which a pivot rod 174 may be inserted. A flange 176 may be connected to pivot rod 174 to allow carriage assembly 150 to pivot about pivot rod 174. A looped hook 178 may be attached to flange 176 to which a hoisting cable may be attached for lifting carriage assembly 150 toward the top most tower segment 132 or other desired tower segment. Carriage assembly 150 may include a locking mechanism 179, as best shown in FIG. 5, for locking the carriage assembly 150 in fixed relation with flange 176 so that carriage 150 does not pivot about pivot pin 174 when carriage assembly 150 is being lifted toward a tower segment with a bearing plate 170 held on bearing plate platform 154.

Bearing plate 170 may include anchor rod apertures (169, 171) or openings through which upper anchor rods 140 may be inserted for securing bearing plate 170 in place. Bearing plate 170 may also include an aperture or opening through which the second end 138 of a post-tensioning tendon 130 may be inserted for securing the tendon 130 to the bearing plate 170. With bearing plate 170 secured within carriage assembly 150, it may be hoisted toward anchor rods 140 so that the anchor rod openings in bearing plate 170 are aligned with the ends of anchor rods 140. Once bearing plate 170 is attached to upper anchor rods 140, locking mechanism 179 may be unlocked thereby allowing carriage assembly 150 to pivot about pivot rod 174. Pivot rod 174 may be of sufficient length to allow for carriage assembly 150 to be laterally translated on pivot rod 174 so that apertures or openings formed in bearing plate 170 may be aligned with upper anchor rods 140.

FIG. 7 illustrates an example of bearing plate 170 being released from carriage assembly 150 after bearing plate 170 is secured to upper anchor rods 140. Bearing plate 170 may be released from bearing plate platform 154 by releasing straps 160 or other attachment mechanisms. Carriage assembly 150 may be moved away from the bearing plate 170 by lowering assembly 150 straight down. In this respect, carriage assembly 150 is being lowered from a height to which it was raised for securing bearing plate 170 to upper anchor rods 140. As carriage assembly 150 is lowered, deflecting surface 158 makes contact with or impinges upon bearing plate 170. This contact combined with the continuous downward motion of flange 176 causes the carriage assembly 150 to pivot about pivot rod 174 and move to the side. As carriage assembly 150 moves to the side, it moves away from bearing plate 170, thereby accelerating the disconnection between carriage assembly 150 and bearing plate 170. This avoids or minimizes the need for a human being to disengage the carriage assembly from the bearing plate/tendon. The angle of deflecting surface 158 determines the rate at which the carriage assembly 150 rotates as carriage assembly 150 is being lowered. In alternate embodiments, locking mechanism 179 may remain locked or carriage assembly 150 may be rigidly connected with a hoisting cable 197 in which case the cable 197 may just bend to the side as a result of the interaction of the deflecting surface 158 and the bearing plate 170.

Figure 8:
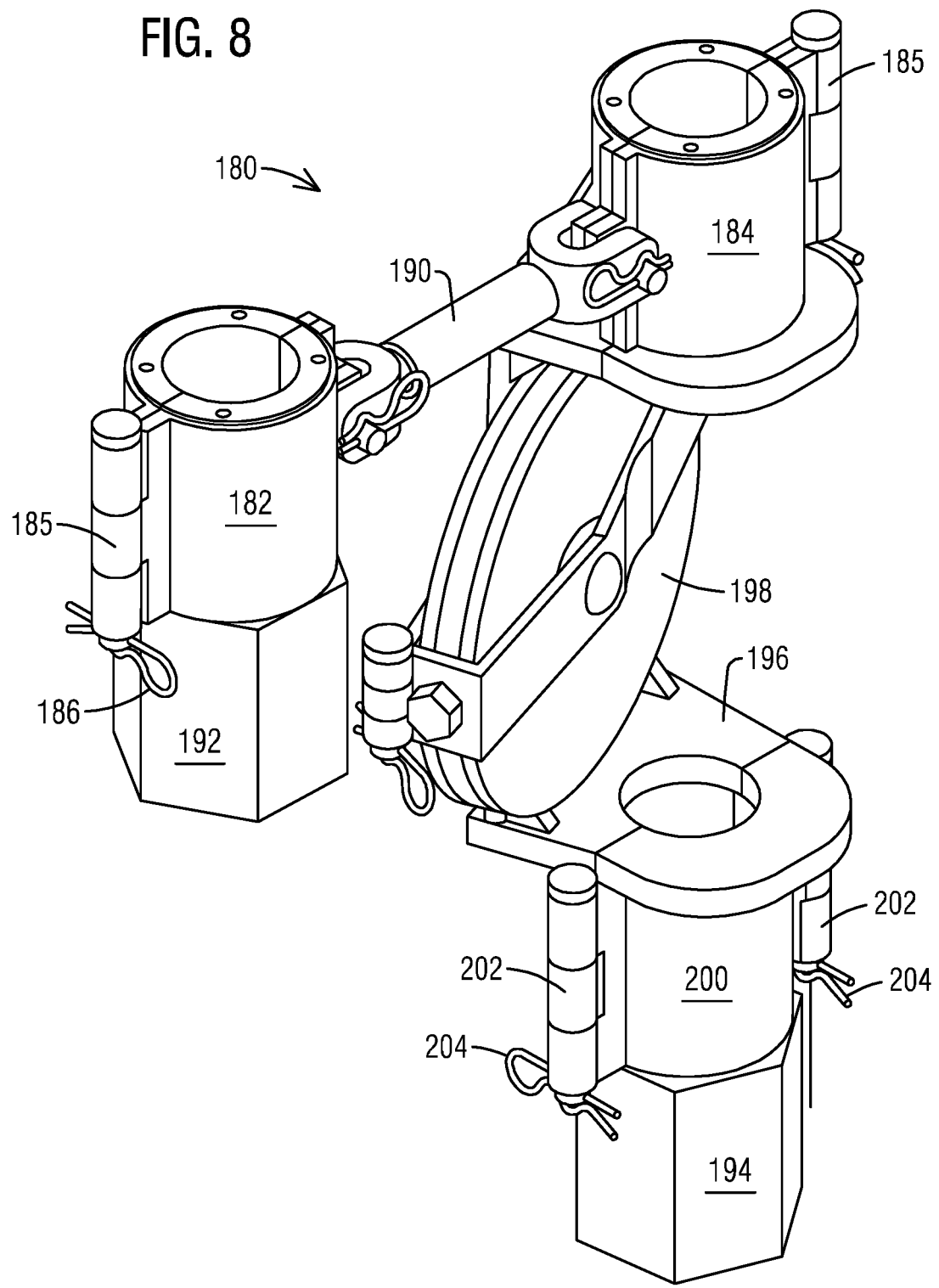
FIG. 8 illustrates a perspective view of an exemplary sheave system in accordance with aspects of the present invention.

FIG. 8 illustrates a perspective view of an exemplary sheave assembly 180 in accordance with aspects of the present invention. Sheave assembly 180 may include a first clasp or shackle 182 and a second clasp or shackle 184 for maintaining sheave assembly 180 in relation to a respective pair of anchor bars such as upper anchor bars 140. Shackles 182, 184, which may be configured as split round clamps, may be clasped or otherwise secured around respective upper anchor bars 140 via hinges 185 and cotter pins 186. A stability bar such as horizontal stability bar 190 may be fitted between shackles 182, 184 for holding them in position relative to each other. Stability bar 190 may be releasably attachable at each end to a respective shackle 182, 184 via conventional attachment mechanisms. Stability bar 190 may have an adjustable length, such as a turnbuckle, for adjusting a distance between shackles 182, 184, such as when they are being positioned on respective upper anchor bars 140. Once positioned on respective upper anchor bars 140, the turnbuckle may be used for expanding or contracting the distance between bars 140 to facilitate the alignment of bars 140 with respective apertures formed within a bearing plate 170 to be attached to those bars 140.

Sheave assembly 180 may include an upper anchor rod nut 192 and a lower anchor rod nut 194. Nuts 192, 194 may be compression nuts configured for securing sheave assembly 180 in place on respective upper anchor rods 140 and maintaining sheave assembly 180 in place at a determined height for lifting bearing plate 170 into place. Sheave assembly 180 may include sheave frame 196 on which sheave or pulley 198 may be mounted. Pulley 198 may be fixed in an offset position with respect to horizontal stability bar 190 to allow for carriage assembly 150 to lift bearing plate 170 into proper position with respect to upper anchor rods 140. Sheave frame 196 may include a clasp or shackle 200, which may be configured as a split round clamp that may be clasped or otherwise secured around a respective upper anchor bar 140 via hinges 202 and associated cotter pins 204.

Figure 9:
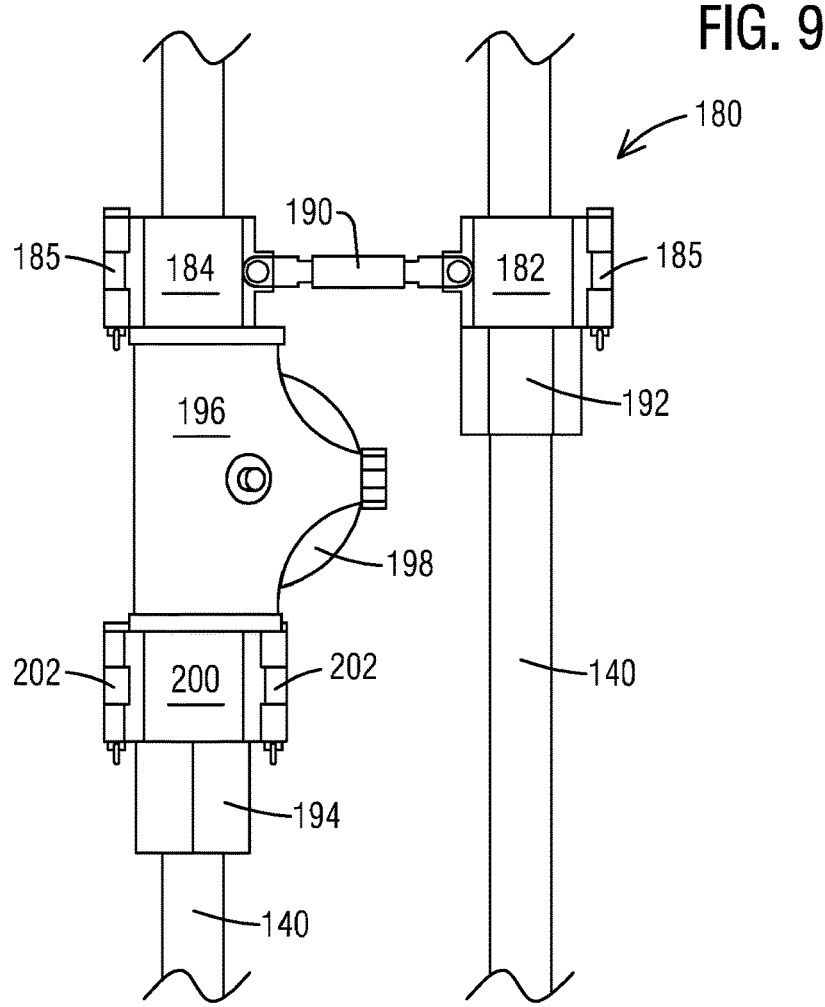
FIG. 9 illustrates a side view of the exemplary sheave system of FIG. 8 connected to a pair of anchor rods in accordance with aspects of the present invention.
Figure 10:
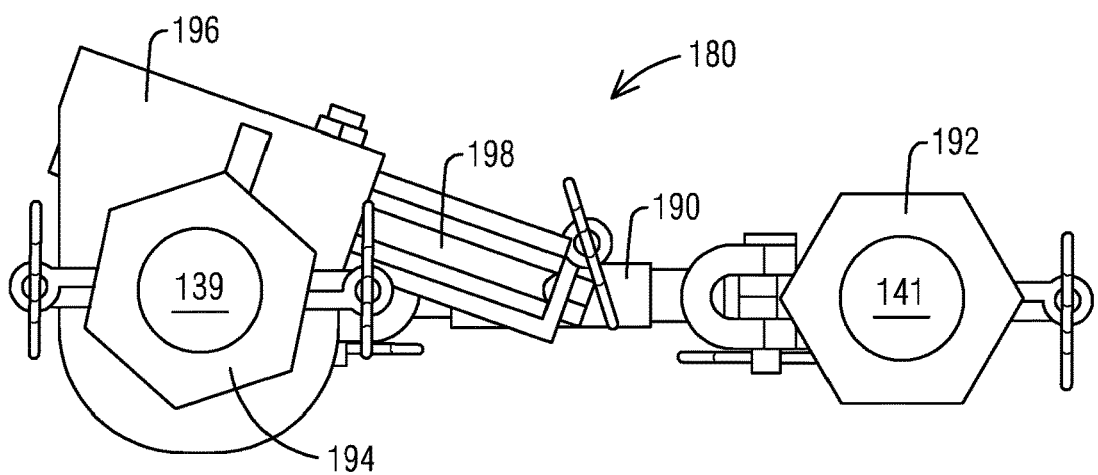
FIG. 10 illustrates a bottom view of the exemplary sheave system connected to a pair of anchor rods of FIG. 9.

FIG. 9 illustrates a side view of sheave assembly 180 secured in place on a pair of upper anchor rods 140. Sheave frame 196 may house pulley 198 and is secured to an upper anchor rod by shackles 182, 200, which can be removed and reused from one pair of anchor rods 140 to another pair of anchor rods 140 for installation of a plurality of post-tensioning tendons 130. Shackles 182, 184, 200 may be hinged and pinned to allow for their removal and consequently removal of the sheave frame 196. Shackles 182, 200 may be supported vertically on anchor rods 140 by compression nuts 192, 194, which may be of a removable or a permanent type. Horizontal stability bar 190 prevents the sheave assembly components from torqueing (rotating horizontally) during a lifting operation. FIG. 10 illustrates a bottom view of sheave assembly 180 secured in place on a pair of upper anchor rods 140.

FIGS. 11-15 illustrate a sequence of steps for stressing a post-tensioning tendon 130 within tower 100 in accordance with aspects of the invention. FIG. 11 illustrates a front view of two hydraulic rams or double action jacks 210 each positioned on a respective one of a pair of lower anchor rods 134 embedded within tower platform 118. FIG. 11 shows a starting position of jacks 210 for stressing a post-tensioning tendon 130 after an upper end 138 of tendon 130 has been secured to a pair of upper anchor rods 140 via a bearing plate 170 and carriage assembly 150 has been moved away from bearing plate 170. Each jack 210 may be positioned between a stressing chair 212 and a temporary upper nut 214 against which jack 210 may be stressed to force a lower bearing plate 215 downwardly toward tower platform 118. Stressing chairs 212 allow access to a lower nut 216, as shown in the side view of FIG. 12, positioned on each one of the pair of lower anchor rods 134.

The side view of FIG. 13 shows that jacks 210 have been extended from their starting position to force lower bearing plate 215 toward tower platform 118 thereby stressing post-tensioning tendon 130. Once lower bearing plate 215 has been moved a desired distance then lower nuts 216 may be turned down against the bearing plate 215, jacks 210 may be retracted and temporary upper nuts 214 turned down against jacks 210 as shown in side view of FIG. 14. FIG. 11E illustrates jacks 210 being extended again to continue stressing post-tensioning tendon 130. The sequence of steps illustrated in FIGS. 12-15 may be repeated as many times as necessary to achieve proper stressing of tendon 130. Once tendon 130 is fully stressed to its required load, jacks 210 may be relaxed, upper nuts 214 may be removed then the jacks 210 and stressing chairs 212 may be removed.

Figure 16:
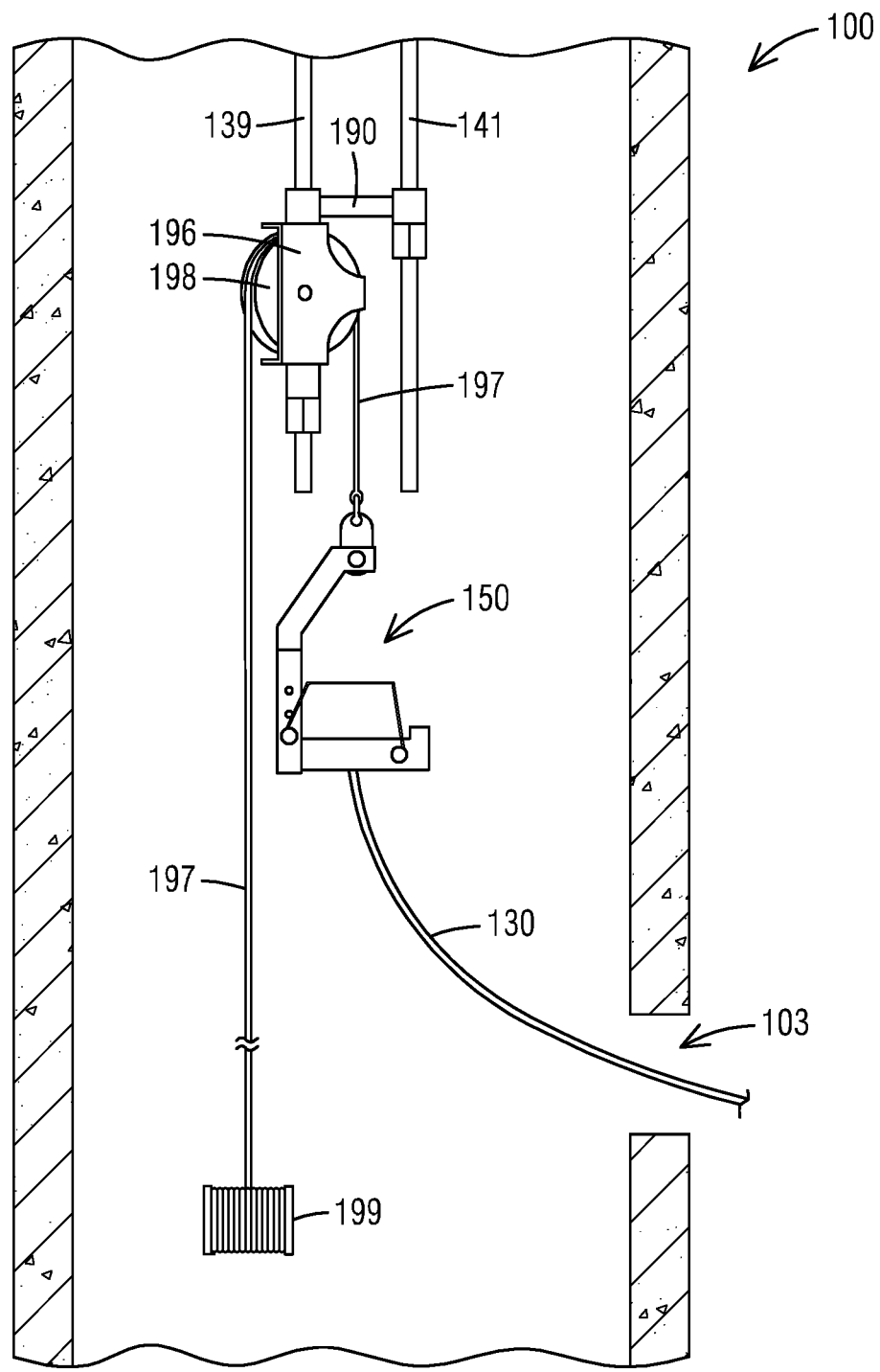
FIG. 16 is a schematic view of the exemplary carriage assembly of FIG. 5 and exemplary sheave system of FIG. 8 positioned with respect to the exemplary tower of FIG. 1 for lifting a tensioning tendon.

FIG. 16 is a schematic illustrating sheave frame 196 mounted on an upper anchor rod 139 with horizontal stability bar 190 spanning the distance between the pair of upper anchor rods 139, 141. Pulley 198 is positioned at an angle from upper anchor rods 140 to allow for a direct centerline position of a hoisting cable 197 for lifting objects between the upper anchor rods 140. FIG. 12 illustrates a first end of hoisting cable 197 operably connected with a stand-alone winch 199 for unwinding and winding the hoisting cable 197. Cable 197 may be threaded through pulley 198 with a second end of cable 197 releasably attached to carriage assembly 150. Post-tensioning tendon 130 may have a first end releasably attached to carriage assembly 150. In an exemplary embodiment, a bearing plate 170 (FIG. 4) may be releasably secured within carriage assembly 150 so that when winch 199 is activated, hoisting cable will lift the bearing plate 170 for attachment to upper bearing rods 140. The position of pulley 198 relative to upper anchor rods 140 allows for apertures within bearing plate 170 to be in substantial alignment with upper anchor rods 140 for attachment of bearing plate 170 to the upper anchor rods 140. Substantial alignment, as used herein, means that the anchor rods can be inserted through the apertures with no or light mechanical restriction which can be overcome by the pulling force exerted by the cable.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A system for installing a tensioning tendon into an equipment tower without the use of an overhead crane, the system comprising:
 a sheave frame (196) attachable to a first anchor rod (139) that extends downward from a portion of an equipment tower (100);
 a stability bar (190) disposed between the sheave frame (196) and a second anchor rod (141) that extends downward from the portion of the equipment tower (100), wherein the stability bar is configured to selectively adjust a distance between the first anchor rod and the second anchor rod;
 a pulley (198) supported by the sheave frame (196) through which a hoisting cable (197) may be passed for connection to an end (138) of a tensioning tendon (130), the pulley (198) supported by the sheave frame (196) so the hoisting cable (197) can lift the tensioning tendon (130) to a position between the first anchor rod and the second anchor rod for attachment to the first and second anchor rods (139, 141),
 wherein a sheave assembly comprising the sheave frame, the stability bar, and the pulley is configured to be selectively positionable along the first anchor rod and to be fixed to the first anchor rod once in a selected position, and
 a carriage assembly (150) comprising a bearing plate platform (154) configured for receiving a bearing plate (170) attached to the end (138) of the tensioning tendon (130), the carriage assembly (150) attachable to the hoisting cable (197) such that lifting of the carriage assembly (150) with the hoisting cable (197) accomplishes lifting of the tensioning tendon (130) to the position for attachment.

2. The system of claim 1, further comprising:
 a first aperture (169) and a second aperture (171) formed in the bearing plate (170); and
 wherein the pulley (198) is supported by the sheave frame (196) such that, when the sheave frame (196) and the stability bar (190) are attached to the anchor rods (139, 141), the hoisting cable (197) lifts the carriage assembly (150) to the position for attachment whereat the first and second apertures (169, 171) are in substantial alignment with the first and second anchor rods (139, 141) respectively.

3. The system of claim 2, further comprising:
 a winch (199);
 wherein the hoisting cable (197) is operably connected with the winch (199) for alternatively winding and unwinding the hoisting cable (197) to alternatively lift and lower the carriage assembly (150).

4. The system of claim 3, further comprising:
 a shank (152) of the carriage assembly (150) from which the bearing plate platform (154) extends, the shank (152) comprising a deflecting surface (158) positioned with respect to the bearing plate platform (154) so that, after the bearing plate (170) is affixed to the first and second anchor rods (139, 141) and the carriage assembly (150) is being lowered, the deflecting surface (158) impinges on the bearing plate (170), thereby deflecting the carriage assembly (150) away from the bearing plate (170).

5. The system of claim 4, wherein the deflecting surface (158) forms an obtuse angle with a vertical portion (156) of the carriage assembly (150) connected to the bearing plate platform (154).

6. The system of claim 1, wherein the sheave assembly further comprises:
   a first shackle (184) secured to the sheave frame and releasably connectable to the first anchor rod (139);
   a second shackle (182) releasably connectable to the second anchor rod (141); and
   wherein the stability bar (190) is operably connected to the first shackle (184) and the second shackle (182) to adjust the distance between the first anchor rod (139) and the second anchor rod (141).

7. The system of claim 6, wherein the sheave assembly further comprises:
   a first compression nut (194) for supporting the first shackle (184) and the sheave frame (196) on the first anchor rod (139); and
   a second compression nut (192) for supporting the second shackle (182) on the second anchor rod (141).

8. The system of claim 1, wherein the pulley (198) is mounted to the sheave frame (196) at an angle relative to the stability bar (190) to provide a direct centerline position of the hoisting cable (197) between the first anchor rod (139) and the second anchor rod (141).

9. The system of claim 1, further comprising:
   a winch (199), the hoisting cable (197) operably connected with the winch (199) for winding and unwinding the hoisting cable (197) to alternatively lift and lower the carriage assembly (150);
   a shank (152) of the carriage assembly (150) from which the bearing plate platform (154) extends, the shank (152) comprising a vertical portion (156) and a deflecting surface (158) whereby the deflecting surface (158) forms an obtuse angle with the vertical portion (156);
   a pivot rod (174) extending through the shank (152);
   a flange (176) connectable to the hoisting cable (197), the pivot rod (174) extending through the flange (176) to allow the carriage assembly (150) to pivot about the pivot rod (174);
   a locking mechanism (179) operable to prevent the carriage assembly (150) from pivoting about the pivot rod (174) when in an engaged position; and
   whereby the deflecting surface (158) is positioned with respect to the bearing plate platform (154) such that, after the bearing plate (170) is affixed to the first and second anchor rods (139, 141) and the carriage assembly (150) is being lowered, the deflecting surface (158) impinges on the bearing plate (170) thereby deflecting the carriage assembly (150) away from the bearing plate (170).

10. A system for installing a tensioning tendon into an equipment tower without the use of an overhead crane, the system comprising:
    a carriage assembly (150) configured for releasably securing an end (138) of a tensioning tendon (130);
    a hoisting cable (197) attached to the carriage assembly (150);
    a sheave assembly (180) attachable to a pair of anchor rods (140) that extend downward from an upper portion (108) of an equipment tower (100), wherein the sheave assembly is configured to be selectively positionable along the pair of anchor rods and to be fixed to the pair of anchor rods once in a selected position;
    the hoisting cable (197) extending through the sheave assembly (180) and connected to a winch (199) at a base of the equipment tower (100), the winch (199) operable to lift the carriage assembly (150) toward the sheave assembly (180); and
    wherein, when the sheave assembly (180) is secured to the pair of anchor rods (140), the hoisting cable (197) is positioned with respect to the pair of anchor rods (140) such that the hoisting cable (197) can be lifted to a position substantially centered between the pair of anchor rods (140).

11. The system of claim 10, the carriage assembly (150) further comprising:
    a shank (152);
    a bearing plate platform (154) extending from the shank (152), the bearing plate platform (154) configured for receiving a bearing plate (170) attached to the end (138) of the tensioning tendon 9130); and
    wherein, the shank (152) comprises a vertical portion (156) and a deflecting surface (158) angled with respect to the vertical portion (156) such that, after the bearing plate (170) is affixed to the pair of anchor rods (140) and the carriage assembly (150) is being lowered, the deflecting surface (158) impinges onto the bearing plate (170), thereby deflecting the carriage assembly (150) away from the bearing plate (170).

12. The system of claim 11, wherein the deflecting surface (158) forms an obtuse angle with the vertical portion (156).

13. The system of claim 10, the sheave assembly (180) further comprising:
    a first shackle (184) configured for releasably connecting the sheave assembly (180) with a first anchor rod (139) of the pair of anchor rods (140) and a second shackle (182) configured for releasably connecting the sheave assembly (180) with a second anchor rod (141) of the pair of anchor rods (140);
    a horizontal stability bar (190) connecting the first shackle (184) with the second shackle (182), the horizontal stability bar (190) inhibiting the sheave assembly (180) from torqueing during lifting of the tensioning tendon (130).

14. The system of claim 13, wherein the horizontal stability bar (190) is configured to selectively adjust a distance between the first anchor rod and the second anchor rod.

15. A method of installing a tensioning tendon into an equipment tower without the use of an overhead crane, the method comprising the steps of:
    attaching a sheave assembly (180) to a pair of upper anchor rods (140) that extend downward from a portion of an equipment tower (100) by positioning the sheave assembly at a selected position along the pair of upper anchor rods and then fixing the sheave assembly to the pair of upper anchor rods at the selected position, the sheave assembly (180) comprising a pulley (198);
    threading a hoisting cable (197) through the pulley (180), the hoisting cable (197) operably connected with a winch (199) for unwinding and winding the hoisting cable (197);
    releasably securing an end of the hoisting cable (197) remote from the winch (199) to a carriage assembly (150) that is, in turn, secured to a second end (138) of the tensioning tendon (130), wherein the carriage assembly (150) comprises a bearing plate platform (154) configured for receiving a bearing plate (170) attached to the second end (138) of the tensioning tendon (130);

activating the winch (199) to lift the carriage assembly (150) and thereby lift the second end (138) of the tensioning tendon (130) to a position proximate the pair of upper anchor rods (140);

connecting the second end (138) of the tensioning tendon (130) to the pair of upper anchor rods (140);

connecting a first end (131) of the tensioning tendon (130) to a pair of lower anchor rods (134) of the equipment tower (100); and activating a pair of hydraulic jacks (210) releasably attached to the pair of lower anchor rods (134) to stress the tensioning tendon (130) to a desired load.

16. The method of claim 15, wherein the step of releasably securing the end of the hoisting cable (197) remote from the winch (199) to the second end (138) of the tensioning tendon (130) is accomplished by releasably securing the bearing plate (170) to the bearing plate platform (154); and wherein the step of connecting the second end (138) of the tensioning tendon (130) to the pair of upper anchor rods (140) is accomplished by connecting the bearing plate (170) to the pair of upper anchor rods (140).

17. The method of claim 16, further comprising:

providing the carriage assembly (150) with a deflecting surface (158) that will impinge on the bearing plate (170) to deflect the carriage assembly (150) away from the bearing plate (170) when the bearing plate (170) is affixed to the pair of upper anchor rods (140) and the carriage assembly (150) is lowered.

18. The method of claim 15, wherein the bearing plate (170) comprises a first aperture (169) and a second aperture (170) formed there through, the first and second apertures (169, 170) positioned within the bearing plate (170) to receive respective ones (139, 141) of the pair of upper anchor rods (140);

the method further comprising:

attaching the sheave assembly (180) to the pair of upper anchor rods (140) so that the pulley (198) positions the hoisting cable (197) on a substantially direct centerline between the pair of upper anchor rods (140);

adjusting a distance between a first anchor rod and a second anchor rod of the pair of upper anchor rods using the sheave assembly to ensure substantial alignment with the first and second apertures; and activating the winch (199) to wind the hoisting cable (197) so the first and second apertures (169, 170) are in the substantial alignment with the respective ones (139, 141) of the pair of upper anchor rods (140).

* * * * *